Figure 8:
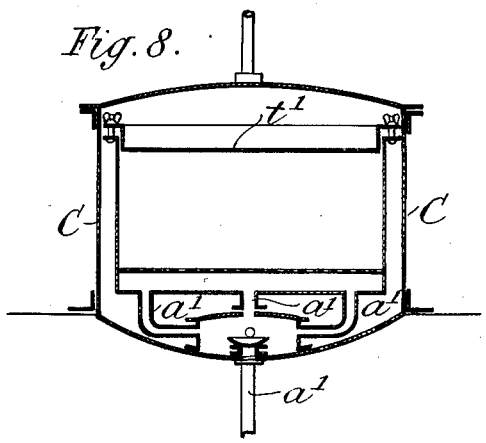

No. 836,101. PATENTED NOV. 20, 1906.
L. DUMONS.
APPARATUS FOR CIRCULATING LIQUIDS IN DYE VATS.
APPLICATION FILED JUNE 12, 1903.
5 SHEETS—SHEET 1.
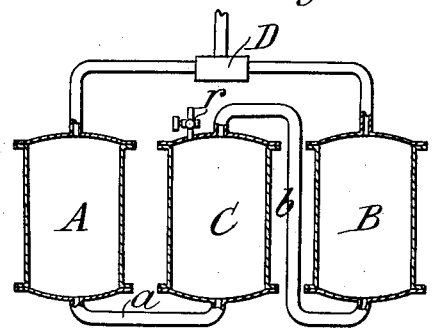
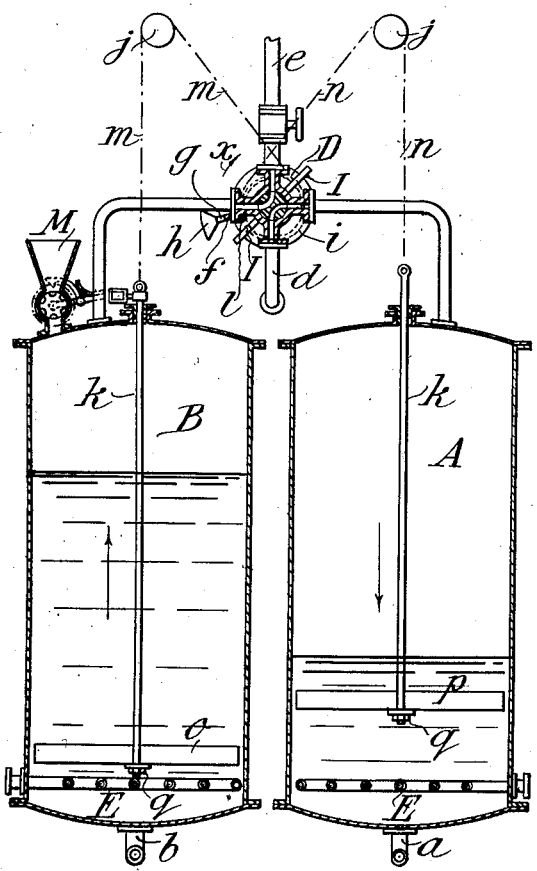
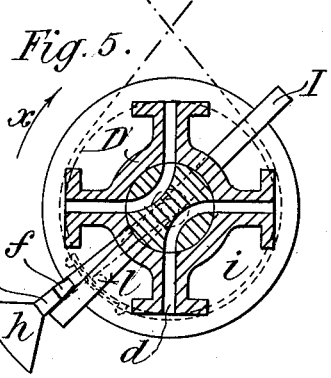
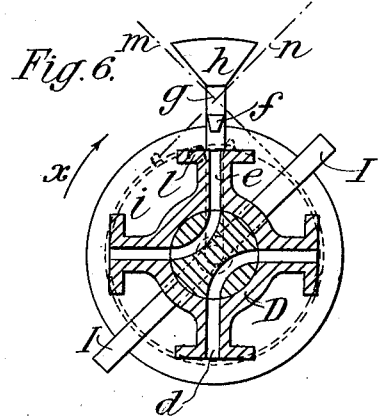
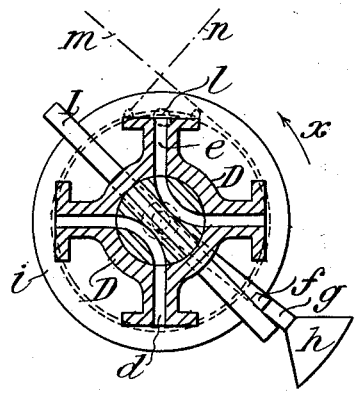
WITNESSES:
Fred White
Thomas Wallace
INVENTOR:
Louis Dumons,
By his Attorneys:

No. 836,101. PATENTED NOV. 20, 1906.
L. DUMONS.
APPARATUS FOR CIRCULATING LIQUIDS IN DYE VATS.
APPLICATION FILED JUNE 12, 1903.
5 SHEETS—SHEET 2.
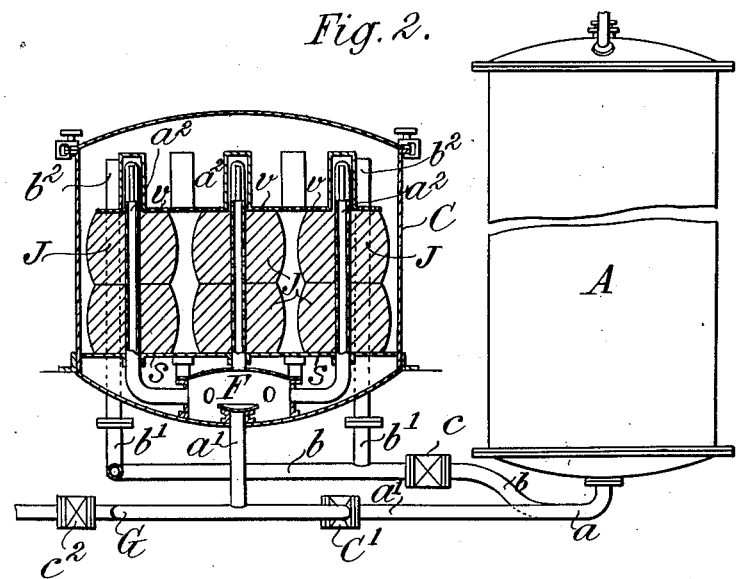
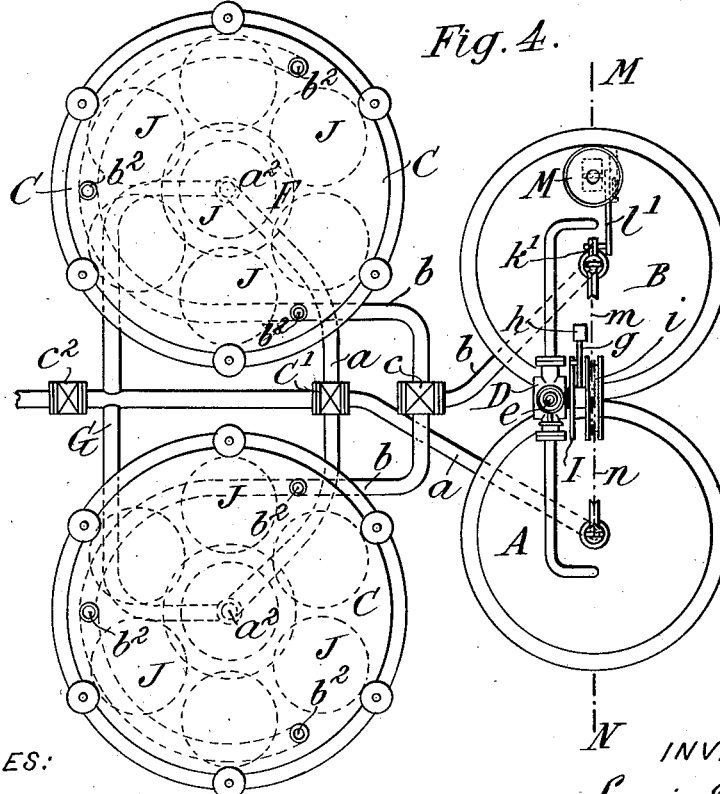
WITNESSES:
Fred White
Thomas Wallace
INVENTOR:
Louis Dumons,
By his Attorneys No. 836,101. PATENTED NOV. 20, 1906.
L. DUMONS.
APPARATUS FOR CIRCULATING LIQUIDS IN DYE VATS.
APPLICATION FILED JUNE 12, 1903.

5 SHEETS—SHEET 3.

WITNESSES:
Fred White
Thomas F. Wallace

INVENTOR:
Louis Dumons,
By his Attorneys
Arthur C. Fraser & Co.

No. 836,101. PATENTED NOV. 20, 1906.
L. DUMONS.
APPARATUS FOR CIRCULATING LIQUIDS IN DYE VATS.
APPLICATION FILED JUNE 12, 1903.

5 SHEETS—SHEET 4.

WITNESSES:
Fred White
Thomas J. Wallace

INVENTOR:
Louis Dumons,
By his Attorneys
Arthur C. Fraser & Co.

No. 836,101. PATENTED NOV. 20, 1906.
L. DUMONS.
APPARATUS FOR CIRCULATING LIQUIDS IN DYE VATS.
APPLICATION FILED JUNE 12, 1903.

5 SHEETS—SHEET 5.

WITNESSES:
Rene Bruine
Theodore T. Snell.

INVENTOR:
Louis Dumons,
By his Attorneys.
Arthur E. Fraser & Co.

UNITED STATES PATENT OFFICE.

LOUIS DUMONS, OF ROUBAIX, FRANCE.

APPARATUS FOR CIRCULATING LIQUIDS IN DYE-VATS.

No. 836,101.  Specification of Letters Patent.  Patented Nov. 20, 1906.

Application filed June 12, 1903. Serial No. 161,156.

*To all whom it may concern:*

Be it known that I, LOUIS DUMONS, a citizen of the Republic of France, residing at Roubaix, Nord, France, have invented a certain new and Improved Apparatus for Circulating Liquids in Dye-Vats, &c., of which the following is a specification.

This invention has for subject an improved means for circulating or applying a liquid under pressure applicable for the leaching or extraction of mineral or organic substances, the extraction of fatty or greasy substances, the dyeing and other treatment of textile materials, and to other useful purposes.

In certain industries currents of liquid are employed for the purpose of producing modifications of a mechanical, physical, or chemical nature in certain raw materials or manufactured products. The regularity of the circulation of the liquids employed is in most cases an essential condition for obtaining a good result.

The chief object of the present invention is to produce a uniform circulation of such a liquid in such manner as to effect a regular irrigation of the substances under treatment.

In my invention an alternating circulation of the liquid in opposite directions through the material is produced.

It is known that in a liquid in the condition of static equilibrium or in the state of permanent motion the pressures obey the hydrostatic law, and the present invention is based upon this observation.

According to my invention I employ two hermetically-closed reservoirs or vessels of any suitable shape, which I will call A and B, respectively, intended for the reception of the liquid which is to be circulated, and a third reservoir or group of reservoirs, which I will call C, likewise closed, containing the material through which the liquid has to pass to effect the required action thereon. The capacity of each of the two main reservoirs A and B is equal to that of the reservoir or reservoirs C, containing the material to be treated.

The bottom of reservoir A communicates with the bottom of reservoir C by a suitable conduit, and the bottom of reservoir B communicates with the top of reservoir C by another conduit. The motive action is imparted to the liquid by an elastic fluid to which a greater or less pressure has been communicated—such as compressed air, an inert gas, steam, or the like—hereinafter referred to as the "pressure medium." Reservoirs A and B are connected at top to a suitable valve or distributer, which places them alternately in communication with the pressure medium and with the atmosphere. These two reservoirs can, moreover, be provided when desired with a heating-coil to allow of heating the liquid in circulation to the desired degree at any stage of the operation.

To produce the alternating circulation of the liquid, reservoir A is first put in communication with the pressure medium and with the bottom of reservoir C. This causes the liquid in reservoir A to pass into reservoir C. The air in vessel C escapes by a special cock provided at the top of said reservoir. When C is filled with the liquid from reservoir A, this air-cock is closed and communication is opened between the bottom of reservoir B and the top of vessel C. At this moment B and C are filled with liquid and there is present in the apparatus a single volume or mass of liquid having no break in its continuity, although it is in part distributed throughout the multitude of infinitesimal channels formed by the saturated material contained in vessel C. The valve or distributer above mentioned is then caused to operate, and the pressure medium exerts its action on the surface of the liquid in reservoir B. This pressure is transmitted equally and in all directions to the entire mass of liquid, and as the valve or distributer has at the same time put reservoir A in communication with the atmosphere a release of pressure occurs in reservoir A and the liquid mass circulates from B to A, passing on the way through vessel C and by reason of the difference of potential—that is to say, difference of pressure—existing between reservoirs B and A.

When reservoir B is empty, vessel C is filled with liquid from reservoir B and reservoir A is again full. At this moment the valve or distributer is caused to act in the opposite direction, thus placing reservoir A in communication with the pressure medium and reservoir B in communication with the atmosphere. The same difference of potential now exists between reservoirs A and B as previously existed between B and A. By reason of this difference of potential, which is strictly equal to that first mentioned, the liquid is driven from reservoir A through the vessel C to reservoir B with the same velocity and under the same pressure as before, and so on.

It will be seen from the above explanation that the materials contained in vessel C are traversed by two currents of contrary direction to each other, but of strictly equal intensity, and the direction of which changes at strictly equal intervals.

The alternate communication of reservoirs A and B with the atmosphere occurs instantaneously, this being attained by a special or suitable arrangement of the valve or distributer; but it is never an entire communication, and this only allows a partial expansion of the pressure medium which has replaced the liquid in reservoir A or B. Thus there exists above the ascending liquid-level in the one or other of the reservoirs A or B, as the case may be, a pressure which is greater than that of the atmosphere, but less than that of the pressure medium. Here, then, in the true sense of the word we have a real back pressure or counter-pressure, a kind of elastic brake, entirely different from what has been incorrectly called "back pressure" or "counter-pressure" in connection with certain dyeing apparatus, in which cases it is nothing more than a loss of head or load occasioned by more or less restricting or contracting the sections of certain orifices through which the liquid has to pass.

In the most frequently employed forms of dyeing apparatus the liquid is set in motion by means of centrifugal or other pumps which impart velocity to the liquid, from which velocity pressure results. In my improved method the contrary is the case—that is to say, I impart a certain velocity to the liquid by means of pressure.

With my invention the liquid may be at rest under a pressure as great as may be desired, while with apparatus in which pumps are employed as soon as the liquid ceases to circulate the pressure becomes *nil* or rather equal to that of the atmosphere. This peculiarity of the method of circulation in my improved apparatus provides a great facility of operation and application and insures great regularity of penetration of the materials under treatment by the liquid. I lay particular stress on this point, because it differentiates my apparatus essentially from those hitherto employed.

With apparatus in which pumps are employed there is only one means of annulling the speed or arresting the motion of the liquid—namely, to stop the pump, the result of which is to bring the pressure down to *nil*, or that of the atmosphere. With my invention I have two means of annulling the speed or arresting the motion of the liquid—namely, first, by stopping the compression of the pressure medium or by suppressing its action, the result of which is to annul the pressure, as in the case of apparatus in which pumps are used; second, by producing a counter-pressure or back pressure equal to that of the pressure medium—that is to say, compressing to the maximum the materials contained in the liquid which is immobilized in this second manner. In producing this alternation of liquid-currents in opposite directions, as above described, I have met with one difficulty in practice. It is necessary, in fact, that reservoir A or B, as the case may be, which is at what I may term the "pressure of counter-pressure", shall be caused to pass instantaneously to the pressure of the pressure medium, and vice versa.

In order to establish absolute isochronism of the circulation from reservoir A to reservoir B, and vice versa, the reversal should be effected by the liquid when a given volume, always the same, has passed from reservoir A into reservoir B and from B into A. If the pressure medium were to be allowed to expand, I could employ a suitable slide-valve as a distributer; but it is necessary to preserve a constant intensity of the pressure in the pressure medium. As I have no fly-wheel to get over the dead-points, I have devised an instantaneously-operating valve or distributer to attain the object in view—namely, alternation of the circulation and perfect equality of the two reverse currents. This identity of the conditions of circulation in the two directions, which is an important point for obtaining uniformity of the distribution of the liquid, would be impossible if a pump were employed to produce the circulation instead of a compressed-fluid or pressure medium, as before mentioned. The pump would work in the one direction by compression, and then the pressure might be very great, while in the other direction it would act by suction, and then the pressure would necessarily be very limited.

In order that my invention may be clearly understood, I will proceed to describe typical apparatus embodying the invention above described, said apparatus being arranged and combined for the treatment of textile materials—for example, bleaching, degreasing, scouring, washing, dyeing, and the like. It will be understood that the said apparatus forms a part of the invention, but that I do not confine myself thereto nor to particular operations referred to, which are given only by way of example and for simplicity's sake.

Figure 14:
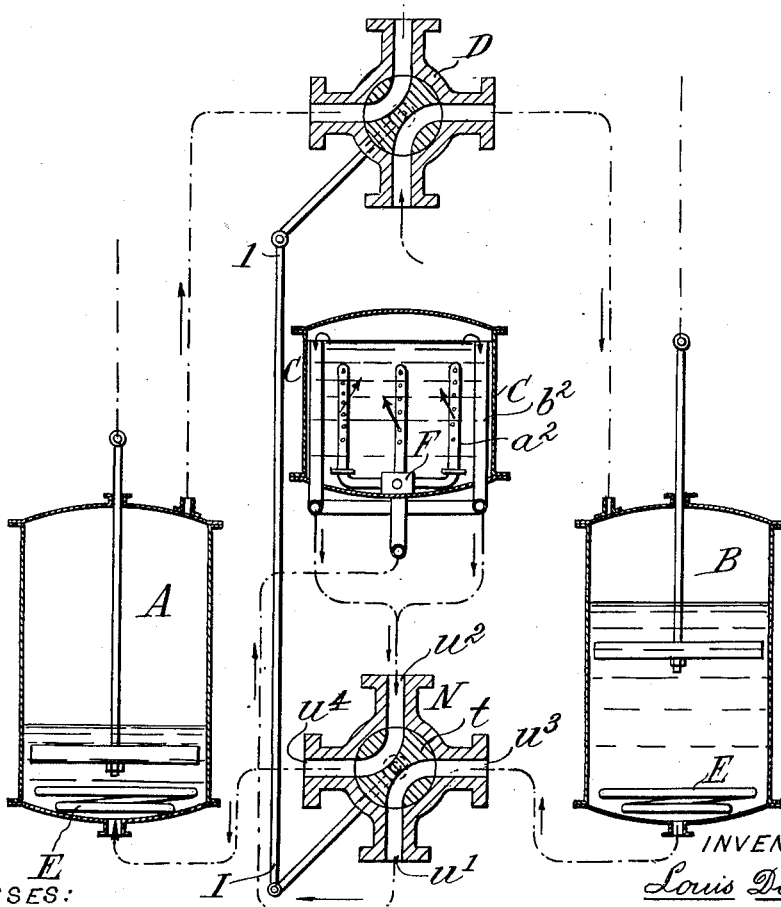
Figure 9:
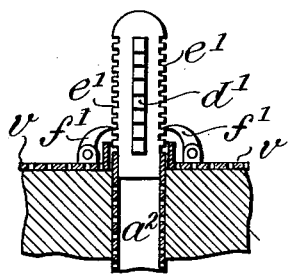
Figure 10:
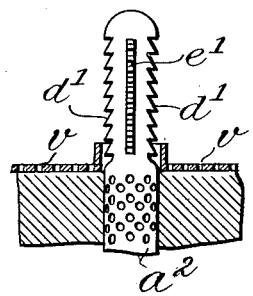
Figure 11:
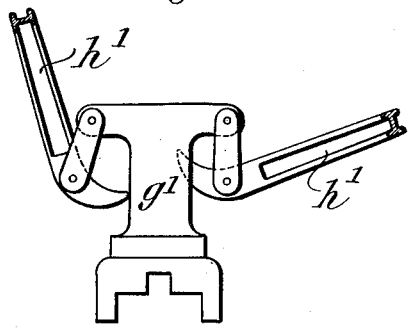
Figure 13:
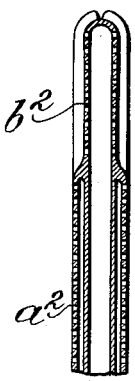
Figure 12:
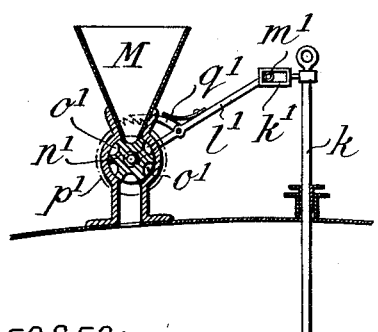
Figure 15:
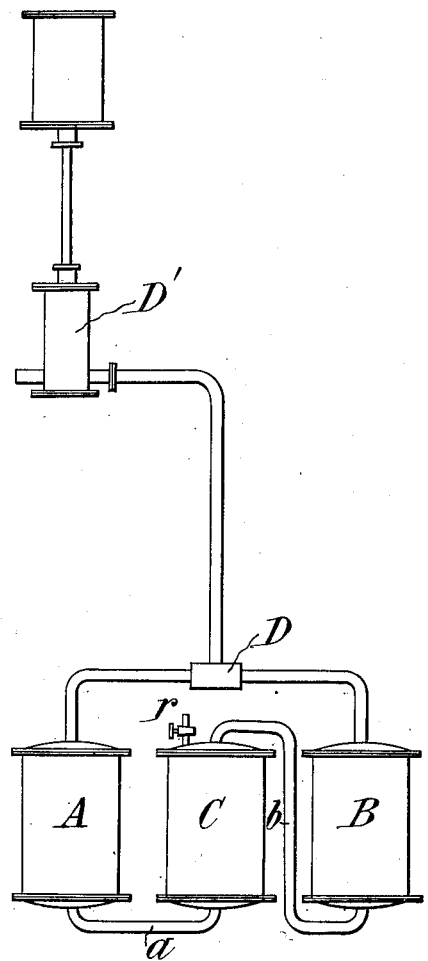

Figure 1 is a diagrammatical figure showing the principal vessels in transverse section. Fig. 2 is a diametral section of one of the vessels containing the material to be treated. Fig. 3 is a diametral section of the two reservoirs and the pressure-valve. Fig. 4 is a plan. Figs. 5, 6, and 7 are transverse sections illustrating the operation of the pressure-controlling valve. Fig. 8 is a central longitudinal section of another form of vessel for the material to be treated. Figs. 9, 10, and 11 are details illustrating the means for compressing the material to be treated. Fig. 12 is a section through a funnel or hopper for introducing dye liquids or the like during operation. Fig. 13 is a modified form of combined inlet and outlet tubes. Fig. 14 is a diagrammatical view of another arrangement of the apparatus embodying the complete invention. Fig. 15 is a diagram similar to Fig. 1, showing a source of fluid-pressure in connection with the apparatus.

The apparatus in Figs. 1 to 4 comprises two hermetically-closed reservoirs for the dye-bath or other liquid, which for convenience I will refer to, as before, as A and B. Each of these vessels A and B is provided with a heating-coil E E, through which steam or other heating medium may be circulated. In this way the liquid can be heated out of contact with the materials which are to be subjected thereto, thus avoiding the injurious action which might be produced on the said materials by the agitation of the liquid in consequence of ebullition. The dye bath or liquid passes from one to the other of the said reservoirs alternately in contrary directions and on its way passes through a series of closed vessels, which I will call C, as before, which may be of any suitable number and which contain the materials to be dyed or treated. Suitable pipes $a$ $a'$ $b$ $b'$ are provided for the circulation of the bath or liquid, these pipes being so arranged as to place the bottom of reservoir A in communication with the bottoms of vessels C and the bottom of reservoir B in communication with the upper parts of the vessels C. For convenience I will refer to these pipes as the "communication-pipes." The pipes which lead from the bottom of reservoir A to the bottoms of vessels C open into a distributer box or chamber F in each of the latter vessels, and into these distribution boxes or chambers open a series of tubes, hereinafter described, which produce the circulation of the liquid in the interior of vessels C.

Suitable valves $c$ $c'$ $c^2$ are provided to allow of shutting off any of the vessels C from the communication-pipes before referred to, of cutting out vessels C or putting them in communication with reservoirs A and B, and of placing vessels C in communication with a run-off or sludge pipe.

Reservoirs A and B are put in communication at their upper parts alternately with the atmosphere and with a source of compressed air—as, for example, an air-pump D', Fig. 15—by an automatic distributer or valve D, Figs. 3 to 7, the automatic action of which is produced by the variations of the level of the liquid in reservoirs A and B. This valve or distributer is constituted by a four-way valve communicating by a suitable pipe $d$ with a source of compressed air and by another pipe $e$ with the atmosphere. The latter pipe is fitted with a valve, Fig. 3, the more or less complete opening of which serves to regulate the expansion of the compressed air which has emptied reservoir A or B (as the case may be) of its contents at each reversal of the current of liquid. Upon the plug of this four-way valve is keyed a lever I, the extremities of which are adapted to be acted upon by a tappet or striker $f$, carried by another lever $g$, mounted loosely on a spindle forming a prolongation or extension of the plug of the valve and having a weight $h$ at its end, which makes this lever a sort of hammer. This hammer is brought slowly to the vertical position by an arrangement of mechanism hereinafter described. As soon, however, as the center of gravity of the weight has passed beyond the vertical the hammer falls sharply to the right or left and imparts a quarter-turn to the four-way valve, thus instantaneously reversing the action of the pressure medium.

On the same spindle as the hammer is a pulley $i$, mounted loosely on said spindle, and to the circumference of this pulley are fixed two chains $m$ and $n$, passing, respectively, over two guide-pulleys $j$. The free end of each of these chains is fixed to a rod $k$, these rods passing into reservoirs A and B through suitable glands. On the said rods are mounted two equilibrated plates $o$ $p$, consisting of a material of greater density than that of the liquid employed in the apparatus. Consequently these plates do not float in any way, but are constantly immersed in the liquid, and their action in no way resembles that of the floats commonly employed. These plates are free to slide on the rods just referred to, or rather the rods can slide in the central hole of the said plates, but they cannot come out of these holes by reason of nuts $q$, placed at their lower ends below each plate.

I will assume the liquid to pass first from reservoir B to reservoir A. When the liquid in the reservoir B has descended to a sufficient point, the plate in reservoir B will begin to emerge. This plate then becomes heavier than the plate in reservoir A, which being completely immersed by the ascending liquid in that reservoir will continue, subject to a vertical upward thrust equivalent to the weight of a volume of liquid equal to its own volume. This greater weight of the plate in reservoir B will continue to increase uninterruptedly until it is sufficient to overcome the friction of all the turning parts of the mechanism and to rotate the loose pulley before mentioned in the corresponding direction—say from left to right. In turning thus from left to right this pulley by means of a pin cast thereon lifts the hammer of the reversing-valve. As soon as the hammer passes beyond the vertical its weight causes it to fall sharply, and the tappet on the hammer strikes the arm of the lever before referred to on the spindle of the reversing-valve and causes this valve to make a quarter-turn. The lengths of the chains before mentioned, the extent to which they wind on the above-described pulley of the reversing-valve, and the length of the rods on which the plates in reservoirs A and B are mounted are all so calculated that the reversal just mentioned takes place while there still remains a little liquid (say about ten centimeters deep) at the bottom of reservoir A, so as not to permit the pressure medium to penetrate into vessels C, containing the materials to be treated. When the liquid has descended in reservoir B to its lowest level, it has risen in reservoir A to its highest level, and the plate in reservoir B emerging partly from the liquid in this reservoir has descended on its rod as low as the nut on said rod will allow it, and the said rod has also descended to its lowest point, while the plate in reservoir A has risen to its highest point, as has also the rod which carries it. The pressure medium now acts on the liquid in reservoir A, and this liquid now passes from reservoir A to reservoir B. The liquid in reservoir A falls until the plate in that reservoir emerging in turn from the liquid becomes heavier than the plate in reservoir B, which the ascending liquid in reservoir B will have again completely immersed. The pulley of the reversing-valve will be thus rotated in the opposite direction and will lift the hammer of the reversing-valve, which at the desired moment will strike the extremity of the said valve and impart a quarter-turn of the reversing-valve in the opposite direction to the preceding operation, thus again reversing the direction of the current of liquid.

I will now describe the internal construction and arrangement of the vessels in which the materials to be treated are contained according to the example or examples of apparatus now under description.

When it is required to treat loose materials—for example, wool or cotton in the flock, lap, or fleese, waste, various raveled materials, rags, seeds, pulps, and the like—the materials are or may be piled or packed in the loose state in a casing, Fig. 8, fitted in each vessel. This casing is provided at top and near the bottom with perforated plates $t'$, between which the materials are piled or packed, the upper perforated plate being adapted to be fastened securely down on top of the casing by thumb-nuts or other suitable means when the materials have been placed therein. A suitable number of tubes or passages open from the bottom of this casing into a distributing box or chamber for the liquid at the bottom of the vessel, through which the liquid enters from the bottom of that reservoir to which it is connected, thence passing by the said tubes or passages to and through the material between the perforated plates and emerging from the top of the vessel by a suitable pipe, whence it passes to the other reservoir.

When it is required to treat combed or carded wool in bobbins or cotton in slivers or material in like form, I prefer to employ the arrangement which I will now proceed to describe, Figs. 2, 3, 9, 10, and 11. According to this arrangement the bobbins or wound material J are passed onto vertical perforated tubes $a^2$, suitably mounted or carried in the vessel or vessels. I may employ any suitable number of these tubes. Seven is a convenient number, and I will assume that seven are used for each vessel. Six of these tubes are placed equidistantly around and at a suitable distance from the inner side wall of the vessel and the seventh at the center of the vessel. At their lower ends these tubes support a removable perforated plate, upon which rest the bobbins passed onto these tubes. All seven tubes open into a distribution box or chamber F at the bottom of the vessel, this box of each vessel being connected to the pipe or conduit which leads to the bottom of the reservoir with which the bottoms of the vessels communicate—viz., reservoir A. The bottom of the other reservoir B communicates by a pipe with the top of each vessel C.

When the liquid is forced from reservoir A to reservoir B, it first enters the distribution-boxes of the vessels containing the material to be treated and thence passes up the seven vertical perforated tubes $a^2$ in each of said vessels. It issues from the perforations of these tubes and passes through the bobbins carried on said tubes from the center to the circumference thereof. A suitable number of non-perforated vertical tubes $b^2$—say three—pass up into each of said vessels to near the top thereof, these pipes branching from a pipe or conduit leading to the bottom of reservoir B. The liquid in the vessels containing the bobbins has no other outlet than these last-mentioned vertical tubes. These tubes, when three are employed, may be arranged in each of the vessels at the angles of an equilateral triangle. Through these tubes the liquid passes by the conduit leading to the bottom of reservoir B into that reservoir. After the reversal of the reversing-valve the liquid in reservoir B returns through the vessels containing the material to be treated to reservoir A. It passes by the conduit last-mentioned and out through the tops of the non-perforated tubes in said vessels and exerts pressure upon the liquid contained in said vessels. The liquid has now no other outlet toward reservoir A than the perforated tubes above described. It accordingly passes back again through the bobbins, traversing them from the circumference to the center, flowing thence into the distribution boxes or chambers at bottom of each vessel, from these boxes to reservoir A, and so on.

The perforated vertical tubes in vessels C are provided at top with bronze hoods $v$, consisting of perforated plates designed for pressing or squeezing the bobbins tightly when these are passed onto the said perforated tubes.

Contrary to the ideas which have been expressed on this subject and to the usual practice, I impart a considerable pressure or squeezing action to the material to be dyed according to my method—say wool or cotton. It is generally believed that the textile materials should be allowed a certain amount of liberty and that they should not be pressed or squeezed much to leave them a certain permeability. I am of the contrary opinion, the advantages which it presents being considerable. In packing the permeable materials tightly one on the other or exerting a squeezing action thereon the internal resistances are equalized and the possibility is diminished of the liquid taking irregular courses through the material, the result being a greater uniformity of operation. Further, by increasing the immobility of the fibers in the case of textile materials the causes of felting and deterioration are reduced. To impart this squeezing or pressure to the materials, I may adopt the following arrangement, Figs. 9, 10, and 11: The upper part of each of the vertical perforated tubes on which the bobbins or the like are passed carries two large racks $d'$, having teeth of three to four centimeters pitch placed at the right and left of the tube at one hundred and eighty degrees from each other and also two small racks $e'$, placed at one hundred and eighty degrees from each other and at ninety degrees from the large racks. The pressure-plates above referred to carried by the vertical perforated tubes are provided with spring-pawls $f'$, which engage in the teeth of the small racks. In order to impart pressure to the said pressure-plates, and thus squeeze the bobbins, a cylindrical cap $g'$, having two levers $h'$ connected to it by links or otherwise suitably, is passed onto the ends of the vertical perforated tubes in turn. The bent portions of the levers of said cap, which form the short arms of said levers, engage in the teeth of the large racks above referred to, and thus by operating said levers the pressure-plates can be forced down to impart the desired pressure in a few strokes. After each stroke the pawls carried by the pressure-plates prevent the said plates from rising. The cap is removable and is taken from tube to tube to impart the pressure.

The reservoirs A and B may be provided with funnels M, Fig. 12, through which any desired dye liquids or extracts may be introduced, and at suitable stages of the dyeing operation any necessary drugs, dyes, or mordants may be added through these funnels. There is great advantage in being able to fractionate and make these latter additions with great regularity. To this end it is necessary that the apparatus itself shall make these additions automatically at suitable times. To attain this object, I may employ the following arrangement. Upon the rod $k$, which carries each of the equilibrated plates above referred to, is keyed a frame $k'$, in which works a roller $m'$, carried by a suitable lever $l'$. This lever is mounted loose on the spindle of the plug $n'$ of a special valve, hereinafter referred to as the "recessed" valve, which I will now describe. This plug is solid; but its circumference is formed or provided with six gaps or chambers $o'$, these gaps or chambers having a capacity of one hundred to one hundred and fifty cubic centimeters, for example. Upon the spindle of the said valve is keyed a ratchet-wheel $p'$, which is actuated by the lever last referred to by means of a spring-pawl $q'$. The rod on which the equilibrated plate is carried acts in its descent upon the roller of said lever and causes this lever to turn. The said lever turns the recessed valve by means of the ratchet-wheel. The dimensions of the parts are such that the stroke of the rod on which the equilibrated plate is mounted causes the operating-lever of the recessed valve to describe an angle of, say, sixty degrees and to bring a gap or recess of the recessed valve to the bottom position where it empties its contents into the reservoir to which it appertains, while another gap or recess is simultaneously brought to the top position and filled. With this arrangement all that is necessary is to introduce into the funnel the liquid which it is desired to introduce into the apparatus, and this presents no difficulty.

In apparatus open to the air "drop-glasses," somewhat after the style of automatic lubricators, are or may be employed; but in closed vessels the use of such devices is novel, especially when, as in the apparatus just described, the internal movement of the liquid in the apparatus is utilized in such manner that the apparatus itself automatically makes the required additions at the most favorable moment.

The apparatus which I have above described is provided with all the necessary pipes G, Fig. 4, and accessories for cleaning. These pipes are provided with cocks $c^2$, which allow of running or blowing off the liquid either direct to the drain or sewer or into tanks or containers where they are kept for subsequent operations. This cleaning or blow-off is or may be effected by the compressed air or other pressure medium employed for producing the alternating circulation.

The improved apparatus also allows of effecting the drying of the materials contained therein. For this purpose the apparatus is first completely emptied of its liquid contents. Then the blow-off cock or cocks is or are closed and the compressed air allowed to fill the apparatus. The pressure rises in the apparatus, and this pressure expresses a portion of the liquid contained in the material. The run-off pipe or pipes is or are then opened, and the pressure in the apparatus falls little by little while the expressed liquid runs off. When the pointer of the pressure-gage with which the apparatus is provided no longer moves, the blow-off cock or cocks is or are again closed and the pressure in the apparatus allowed to rise. A further quantity of liquid is expressed, and this is expelled, as before, and so on. After this operation has been performed a few times, alternately opening and closing of the blow-off cock or cocks, the current of compressed air is allowed to pass through the materials for a few moments, and in this way a drying can be effected almost as complete as with the best drying apparatus or hydro-extractors now in use. This property possessed by my improved apparatus of enabling the passage of a current of air through the material to succeed the passage of the liquid therethrough renders the said apparatus admirably adapted for effecting the oxidizing action which is necessary in certain instances—for example, in dyeing cotton goods with anilin-black or indigo-blue and in the dyeing of woolen goods indigo-blue. With my apparatus all these operations can be effected without opening the apparatus and without in any way moving or handling the materials under treatment. I thus avoid the expense of handling or manipulating the goods, which manipulations, moreover, have always an injurious effect on the materials under treatment.

By imparting to the compressed air (which is already heated by the work of compression) a sufficient degree of heat and allowing the current of hot air to pass through the materials for a sufficient time the complete drying of the materials may be effected.

The apparatus above described can be used for dyeing textile materials of all kinds at any stage of their preparation. The general arrangement remains the same; but the parts for the reception of the materials will vary according to the condition or stage of preparation of the materials. Thus, for example, in dyeing yarns or threads in hanks I employ instead of the perforated vertical tubes hereinbefore described a drum or casing, Fig. 8, in each of the vessels C, this having a removable perforated cover and a perforated false bottom at its lower part, as hereinbefore described in connection with the treatment of loose materials. The hanks are placed on this false bottom of the said drum or casing, the perforated cover is put on, and the thumb nuts or devices with which it is provided, as before mentioned, are screwed down so as to compress or squeeze the hanks tightly. The drum being thus closed, the outer cover of vessel C is put on and the liquid circulated, as before described.

Instead of the construction of vertical perforated tubes hereinbefore described for the reception of bobbins and the like I may employ for the same or analogous purposes an arrangement of vertical tubes, Fig. 13, which I will proceed to describe and which permit of the liquid entering and leaving the vessels C by one and the same connection or part, thus dispensing with the vertical non-perforated open-topped tubes hereinbefore described as employed in connection with said perforated tubes. According to this modified arrangement I employ an arrangement of two concentric tubes $a^2$ $b^2$, which may be conveniently cast or formed in one with each other. The outermost tube extends for a suitable distance—say three-fourths the height of the inner tube—the space between the outer and inner tubes being closed at the top of the former. The outer tube and that portion of the inner tube which extends up beyond the outer tube are perforated. The lower end of the outer tube is conveniently secured in the bottom of the vessel C, and a two-way junction-piece is secured to the under face of vessel C, so as to coincide therewith. One way or passage $a^3$ of this junction-piece communicates with the space between the inner and outer tubes and also with reservoir A, while the other way or passage $b^3$ of the junction-piece communicates with the inner tube and also with reservoir B. Thus the liquid can pass from the bottom of reservoir A up the space between the inner and outer tubes, out through the perforations in said outer tube, and out through the bobbins or wound material thereon, and when the liquid has risen in the vessel to the level of the perforated portion of the inner tube it passes through these latter perforations into the interior tube and thence by the corresponding way or passage of the junction-piece and conduit to reservoir B. It will be understood that such an arrangement of concentric tubes as just described can be used for each of the vessels containing the material to be treated.

According to a modified arrangement of the apparatus, Fig. 14, the liquid passing between reservoirs A and B in opposite directions alternately may be caused to always circulate in the one direction in the vessel or vessels containing the material to be treated. According to this arrangement the said vessel C or vessels is or are situated higher than the reservoirs A and B, and these reservoirs communicate with the said vessel or vessels by means of a special device which I will call the "auxiliary valve," consisting of a four-way valve N, in which a diametrical diaphragm $t$ is so fitted as to be capable of turning to the extent of ninety degrees. One way of this valve, and which I will call $u'$, communicates with the distribution-box F, provided at the bottom of vessel C or of each vessel C, into which distribution-box open a series of single perforated tubes $a^2$ similar to that hereinbefore described for supporting bobbins or the like. Way $u^2$ of the said auxiliary valve communicates with a set of non-perforated tubes $b^2$, similar to that already described as employed in conjunction with said single perforated tubes and by which the liquid admitted to vessel or vessels C by the said perforated tubes leaves the said vessel or vessels. Way $u^3$ of the auxiliary valve communicates with the bottom of reservoir B, and way $u^4$ with the bottom of reservoir A. A four-way reversing air-valve D, similar to that hereinbefore described, is used in combination with this four-way auxiliary valve, the said air-valve being connected to the auxiliary valve by means of a coupling-rod $l$ or other suitable means in such manner that when the reversing air-valve makes a quarter-turn, as before described, a quarter-turn is imparted to the auxiliary valve. In this way the distribution-box or respective distribution-boxes of the vessel or vessels containing the material under treatment is put in communication with reservoir B and reservoir A alternately. When reservoir B is empty, the reversing-valve reverses, and the motion being transmitted to the auxiliary valve this latter puts the distribution box or boxes into communication with reservoir A at the same time as the reversing-valve admits the pressure medium to reservoir A and puts reservoir B in connection with the atmosphere. Owing to the difference of level between the vessel or vessels containing the materials and the reservoirs, the liquid in this vessel or these vessels flows therefrom into reservoir A. Then, when reservoir A is full, the liquid runs from the said vessel or vessels into reservoir B, and so on, the vessel or vessels containing the materials remaining always full of liquid.

Having now particularly described and ascertained the nature of my invention and in what manner the same has to be performed, I declare that what I claim is—

1. In an improved means for producing the alternating circulation of a liquid under pressure through mineral or organic substances which have to be acted on by the liquid, the combination with a reservoir or vessel containing the material to be treated, of two reservoirs for the reception of the liquid which is to be circulated, one of which communicates at its bottom with the bottom of the reservoir for the material, and the other communicates at its bottom with the top of the same reservoir, a source of fluid under pressure greater than atmospheric, a valve or distributer with which both vessels for the liquid communicate at their tops and which alternately puts them in connection with the source of fluid under pressure and with the open air, in order that the liquid may circulate alternately in opposite directions, through the material to be treated, said distributer consisting of a four-way valve, a lever keyed upon the plug thereof and another lever mounted loosely on a spindle forming a prolongation or extension of the plug, said loose lever carrying a tappet in position to actuate the keyed lever and said loose lever having a weight at its end, this system being so arranged that as soon as the center of gravity of the weight has passed beyond the vertical, the weight falls sharply to the right or left and imparts a quarter-turn to the four-way valve thus instantaneously reversing the action of the pressure medium.

2. In an improved means for producing the alternating circulation of a liquid under pressure through mineral or organic substances which have to be acted on by the liquid, the combination with a reservoir or vessel containing the material to be treated, of two reservoirs for the reception of the liquid which is to be circulated, one of which communicates at its bottom with the bottom of the reservoir for the material, and the other communicates at its bottom with the top of the same reservoir, a source of fluid under pressure greater than atmospheric, a valve or distributer with which both vessels for the liquid communicate at their tops and which alternately puts them in connection with the source of fluid under pressure and with the open air, in order that the liquid may circulate alternately in opposite directions, through the material to be treated, said distributer consisting of a four-way valve, a lever keyed upon the plug thereof and another lever mounted loosely on a spindle forming a prolongation or extension of the plug, said loose lever carrying a tappet in position to actuate the keyed lever and said loose lever having a weight at its end, this system being so arranged that as soon as the center of gravity of the weight has passed beyond the vertical, the weight falls sharply to the right or left and imparts a quarter-turn to the four-way valve thus instantaneously reversing the action of the pressure medium, a pulley loosely mounted on the spindle of the hammer and to the circumference of which are fixed two chains, a rod fixed to the free end of each of these chains, these rods passing into the reservoirs for the liquid, equilibrated plates carried by said rods and consisting of a material of greater density than that of the liquid employed in the apparatus, and a pin carried by the pulley and which by the rotation of the pulley lifts the weight.

3. The combination with perforated tubes on which are passed the bobbins, of hoods at their top part, designed for pressing tightly the bobbins through which pass the liquid, and a ratchet-and-pawl connection for holding the hoods down on the tubes.

4. In an improved means for producing the alternating circulation of a liquid under pressure through mineral or organic substances which have to be acted on by the liquid, the combination with a reservoir or vessel containing the material to be treated, of two reservoirs for the reception of the liquid which is to be circulated, one of which communicates at its bottom with the bottom of the reservoir for the material, and the other communicates at its bottom with the top of the same reservoir, a source of fluid under pressure greater than atmospheric, a valve or distributer with which both vessels for the liquid communicate at their tops and which alternately puts them in connection with the source of fluid under pressure and with the open air, in order that the liquid may circulate alternately in opposite directions, through the material to be treated, said distributer consisting of a four-way valve, a lever keyed upon the plug thereof and another lever mounted loosely on a spindle forming a prolongation or extension of the plug, said loose lever carrying a tappet in position to actuate the keyed lever and said loose lever having a weight at its end, this system being so arranged that as soon as the center of gravity of the weight has passed beyond the vertical, the weight falls sharply to the right or left and imparts a quarter-turn to the four-way valve thus instantaneously reversing the action of the pressure medium, a pulley loosely mounted on the spindle of the hammer and to the circumference of which are fixed two chains, a rod fixed to the free end of each of these chains, these rods passing into the reservoirs for the liquid, equilibrated plates carried by said rods and consisting of a material of greater density than that of the liquid employed in the apparatus, and a pin carried by the pulley and which by the rotation of the pulley lifts the weight, each vessel having a funnel through which any desired material may be introduced, this funnel being provided with a valve controlled by the plate in the corresponding vessel.

5. Means for the circulation of liquid consisting of a central tube having a lower closed portion around which is a perforated partition forming an annular space through which passes the liquid dye which escapes through the holes of the outer partition, said central tube having an upper perforated portion through which the liquid comes back.

6. Means for producing the circulation of a liquid under pressure through substances to be acted on by the liquid, including in combination a vessel containing the material to be treated, and means for circulating the liquid in alternating directions through said vessel and through the material therein, a valve controlling the direction of movement of the liquid, a lever fixed upon the movable member of the valve, a second lever movable independently of the valve and carrying a weight, said second lever being adapted to engage the valve-controlling lever and by its weight to turn the valve and reverse the action of the apparatus as soon as the weight passes a vertical position.

7. Means for producing the circulation of a liquid under pressure through substances to be acted on by the liquid, including in combination a reservoir for the liquid, a funnel M through which any desired material may be introduced from the outside into said reservoir, a mechanical feeding means between said funnel and reservoir, and a device for operating said mechanical feeding means by the rise and fall of liquid within said reservoir.

In witness whereof I have hereunto signed my name, this 29th day of May, 1903, in the presence of two subscribing witnesses.

LOUIS DUMONS.

Witnesses:
  AUGUSTUS E. INGRAM,
  CHARLES MARDEBT.